UNITED STATES PATENT OFFICE.

RHETHERFORD B. MARTIN, OF NEW YORK, N. Y.

COMPOSITION FOR TREATING MANUFACTURED RUBBER.

1,422,115. Specification of Letters Patent. Patented July 11, 1922.

No Drawing. Application filed May 20, 1919. Serial No. 298,421.

*To all whom it may concern:*

Be it known that I, RHETHERFORD B. MARTIN, a citizen of the United States, and resident of the borough of Manhattan, city of New York, county and State of New York, have invented a certain new and useful Composition for Treating Manufactured Rubber, of which the following is a specification.

My present invention relates to a composition of matter for treating manufactured rubber goods. It is well known that in manufactured rubber goods, such as automobile tires, garden hose and the like, that the rubber loses its life and becomes hard after it has been manufactured for some time owing to various causes, such as slow vulcanization due to heat, or oxidization due to the atmosphere, and to various other causes.

I have discovered that by treating manufactured rubber goods with a coating of an organic compound containing nitrogen and hydrogen, the rubber may be kept in nearly its original elastic condition and that deterioration is retarded and in some instances almost entirely prevented.

There are many compositions containing nitrogen and hydrogen which come within the scope of my invention such as amines (primary) of which amidobenzene or phenylamine is an example; amines (secondary) of which ethyl aniline is an example; amines (tertiary) of which dimethyl-a-naphthyl-amine is an example; diamines, p-amidobenzyl-dimethylamine; carboxylic acid group, oxybenzoic acid; amidophenols and their derivatives, o-amidophenol or m-amidophenol. The composition which I prefer to use is phenylamine and cotton seed oil, the ratio being nine parts of phenylamine to one part of cotton seed oil. The cotton seed oil has the effect of not only holding phenylamine in contact with rubber until it has had an opportunity to act, but also slightly softens the surface of the rubber, enabling the phenylamine to impregnate the rubber and act more efficiently. Other binders or vehicles may be used in place of cotton seed oil. Such other binders or vehicles should be composed of substances which do not have a deleterious effect on the rubber. Such a binder or vehicle would be glycerine, which binder is not deleterious, but is as a matter of fact, beneficial to rubber to some extent.

In some instances where the rubber is very old, it may be beneficial to use a composition containing a larger quantity of cotton seed oil, for example, in some instances it may be preferable to use at least twenty per cent of cotton seed oil.

If an automobile tire is treated with a coating such as above described and allowed to stand for twenty-four hours until it has had an opportunity to soak into and penetrate the rubber the life of the tire is greatly prolonged. By treating the tires by the above method about once in every three months many times the normal service is obtained from the tires.

I prefer to apply the solution with a brush and set the rubber article aside for twenty-four hours, until the coating is absorbed by the rubber.

It is quite obvious, however, that there are other ways in which the material can be applied other than with a brush, for example, the rubber goods may be dipped into the solution, or the solution may be applied in the form of a spray or vapor.

I have found in many instances that manufactured rubber which has begun to harden and lose some of its elasticity may be restored to a condition approaching its original condition by being treated by my method.

I claim:

1. A liquid composition for treating manufactured rubber comprising an amine compound mixed with a vehicle adapted to lie upon the rubber without dissolving it.

2. A composition for treating manufactured rubber, comprising an aromatic amine and a binder adapted to lie upon the rubber without dissolving it.

3. A composition for treating manufactured rubber containing phenylamine and a binder adapted to lie upon the rubber without dissolving it.

4. A composition for treating manufactured rubber containing phenylamine and cotton seed oil.

5. A composition for treating manufactured rubber containing a larger portion of phenylamine and a smaller portion of cotton seed oil.

6. A composition for treating vulcanized rubber, comprising a material adapted to impregnate the rubber to restore elasticity to it and a vehicle consisting of a material nearly inert to the rubber and adapted to lie on its surface.

7. A composition for treating manufactured rubber comprising an amino compound adapted to preserve and restore elasticity to the rubber and a vehicle consisting of a material substantially inert to said rubber.

In testimony whereof, I have affixed my signature to this specification.

RHETHERFORD B. MARTIN.